(12) United States Patent
Tada et al.

(10) Patent No.: US 8,096,737 B2
(45) Date of Patent: Jan. 17, 2012

(54) SPINDLE DEVICE OF MACHINE TOOL

(75) Inventors: Keigo Tada, Nara (JP); Tomohiko Hayashi, Mount Prospect, IL (US)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 424 days.

(21) Appl. No.: 12/464,637

(22) Filed: May 12, 2009

(65) Prior Publication Data

US 2009/0279975 A1 Nov. 12, 2009

(30) Foreign Application Priority Data

May 12, 2008 (JP) ................................. 2008-125025

(51) Int. Cl.
*B23C 5/26* (2006.01)
*B23Q 11/00* (2006.01)

(52) U.S. Cl. ............................ 409/233; 409/137; 408/67

(58) Field of Classification Search .................. 409/233, 409/231, 232, 137, 134, 135–136; 408/67–68, 408/58

See application file for complete search history.

(56) References Cited

U.S. PATENT DOCUMENTS

| 3,057,417 | A | * | 10/1962 | Sandvig | 175/212 |
| 7,393,311 | B1 | * | 7/2008 | Giovanelli et al. | 409/233 |
| 7,665,937 | B2 | * | 2/2010 | Kammermeier et al. | 409/137 |
| 2009/0279964 | A1 | * | 11/2009 | Hyatt et al. | 409/234 |
| 2010/0166510 | A1 | * | 7/2010 | Inamasu et al. | 407/11 |
| 2010/0266358 | A1 | * | 10/2010 | Hiramoto et al. | 409/137 |

FOREIGN PATENT DOCUMENTS

| CA | 2486150 A | 11/2003 |
| EP | 1844897 A1 * | 10/2007 |
| JP | 2005-532917 A | 11/2005 |
| JP | 2010064421 A * | 3/2010 |

OTHER PUBLICATIONS

Machine Translation of EP 1844897, which EP '897 was published Oct. 17, 2007.*

* cited by examiner

*Primary Examiner* — Erica E Cadugan
(74) *Attorney, Agent, or Firm* — Smith Patent Office

(57) ABSTRACT

It is an object to provide a spindle device of a machine tool which has a simple structure and is capable of having high suction efficiency of cutting chips. A draw bar bringing engaging claws into engagement with a tool holder or releasing the engagement includes an engagement drive part moving the engaging claws to an engagement position with the tool holder; and a draw bar main body connected to the engagement drive part, and the engagement drive part is inserted into the draw bar main body to be detachably connected to an inner surface of the draw bar main body.

4 Claims, 6 Drawing Sheets

SPINDLE DEVICE OF MACHINE TOOL

BACKGROUND OF THE INVENTION

1. Field of the Invention

The present invention relates to a spindle device of a machine tool, and more particularly, to a spindle device capable of having improved efficiency in collecting cutting chips in dust form generated especially during the machining of light metal.

2. Description of the Related Art

As a milling cutter in which cutting chips in dust form generated during a cutting process of, for example, a magnesium alloy can be collected, there is one described in Japanese Patent Application Publication No. 2005-532917. This milling cutter has a suction opening formed in an axial core of a shank, and the suction opening communicates with a suction hopper attached to a clamping and supplying device.

The aforesaid conventional milling cutter has a problem that the structure is complicated since the suction hopper is attached to the clamping and supplying device, and automatic tool change is not possible due to a structural reason.

Here, as a spindle device capable of solving the above problems, the present applicant has developed a spindle device in which a suction hole extending from a tool holder to penetrate through a draw bar in a spindle is formed and cutting chips are sucked from the suction hole. The structure having the suction hole may cause a problem of increasing the outside diameter of the draw bar, and as a result, increasing the inside diameter of the spindle compared with that in the conventional art, depending on the structure of the draw bar, and further, may lower suction efficiency because air is sucked from a portion connected to a drive mechanism reciprocatingly driving the draw bar.

SUMMARY OF THE INVENTION

The present invention was made in view of the aforesaid conventional problems, and has an object to provide a spindle device of a machine tool which has a simple structure and allows automatic change of tools, whose spindle does not have a large inside diameter, and which is capable of having high suction efficiency of cutting chips.

An invention according to one aspect of the present application is a spindle device of a machine tool comprising: a spindle head; a spindle which is rotatably supported by the spindle head and to which a tool holder is attachable; and a clamping mechanism clamping/unclamping the tool holder to/from the spindle, wherein the clamping mechanism includes: a draw bar bringing an engaging claw into engagement with the tool holder or releasing the engagement; and a drive mechanism moving the draw bar in an unclamping direction, the draw bar has a draw bar-side suction hole penetrating through the draw bar in an axial direction and communicating with a holder-side suction hole formed in the tool holder, the draw bar includes: an engagement drive part moving the engaging claw to an engagement position with the tool holder; and a draw bar main body connected to the engagement drive part, and the engagement drive part is inserted in the draw bar main body and detachably connected to an inner surface of the draw bar main body.

In a preferable embodiment of the invention of the one aspect, the engagement drive part is inserted to be screwed to the inner surface of the draw bar main body.

According to the invention of the one aspect and the preferable embodiment, a rear end of the engagement drive part forming a front portion of the draw bar is inserted into a front end of the draw bar main body forming a rear portion of the draw bar to be screwed to the inner surface of the draw bar main body, so that the both are attachable/detachable to/from each other. Therefore, it is possible to secure a large diameter of the draw bar-side suction hole without increasing the inside diameter of the spindle, especially its portion corresponding to the engagement drive part, which makes it possible to enhance suction efficiency of cutting chips.

Incidentally, a structure in which the rear end of the engagement drive part is put over and screwed to the front end of the draw bar main body results in an increase in diameter of the rear end of the engagement driving part even if the diameter of the draw bar-side suction hole is the same, and as a result, due to the structure in which the engaging claw is disposed on an outer side of the engagement drive part, this structure results in an increase in the diameter of a through hole of the spindle, and thus the outside diameter of the spindle.

An invention of another aspect of the present application is a spindle device of a machine tool comprising: a spindle head; a spindle which is rotatably supported by the spindle head and to which a tool holder is attachable; and a clamping mechanism clamping/unclamping the tool holder to/from the spindle, wherein the clamping mechanism includes: a draw bar bringing an engaging claw into engagement with the tool holder or releasing the engagement; and a drive mechanism moving the draw bar in an unclamping direction, the draw bar has a draw bar-side suction hole penetrating through the draw bar in an axial direction and communicating with a holder-side suction hole formed in the tool holder, and the drive mechanism has an inner pipe to which a rear end of the draw bar is inserted, and the spindle device further including a seal mechanism which is provided between the inner pipe and the draw bar and which has a seal member fixed to the inner pipe and slidably in contact with an outer peripheral surface of the draw bar.

According to the invention of the other aspect, since the seal mechanism is provided between the inner pipe and the rear end of the draw bar, it is possible to prevent outside air from being sucked into the inner pipe, which makes it possible to enhance efficiency in collecting cutting chips.

In a preferable embodiment of the invention of the other aspect, the seal mechanism includes an elastic member biasing the seal member in the fixing direction so as to bring the seal member into pressure contact with a step of the inner pipe.

According to the above embodiment, since the seal mechanism includes the elastic member bringing the seal member, which is slidably in contact with the outer peripheral surface of the rear end of the draw bar, into pressure contact with the step of the inner pipe, it is possible to constantly bring an end surface of the seal member into pressure contact with the step owing to an elastic force of the elastic member while bringing an inner peripheral surface of the seal member into slidable contact with the outer peripheral surface of the draw bar. This makes it possible to more surely prevent the entrance of outside air.

DETAILED DESCRIPTION OF THE PREFERRED EMBODIMENTS

Figure 1:
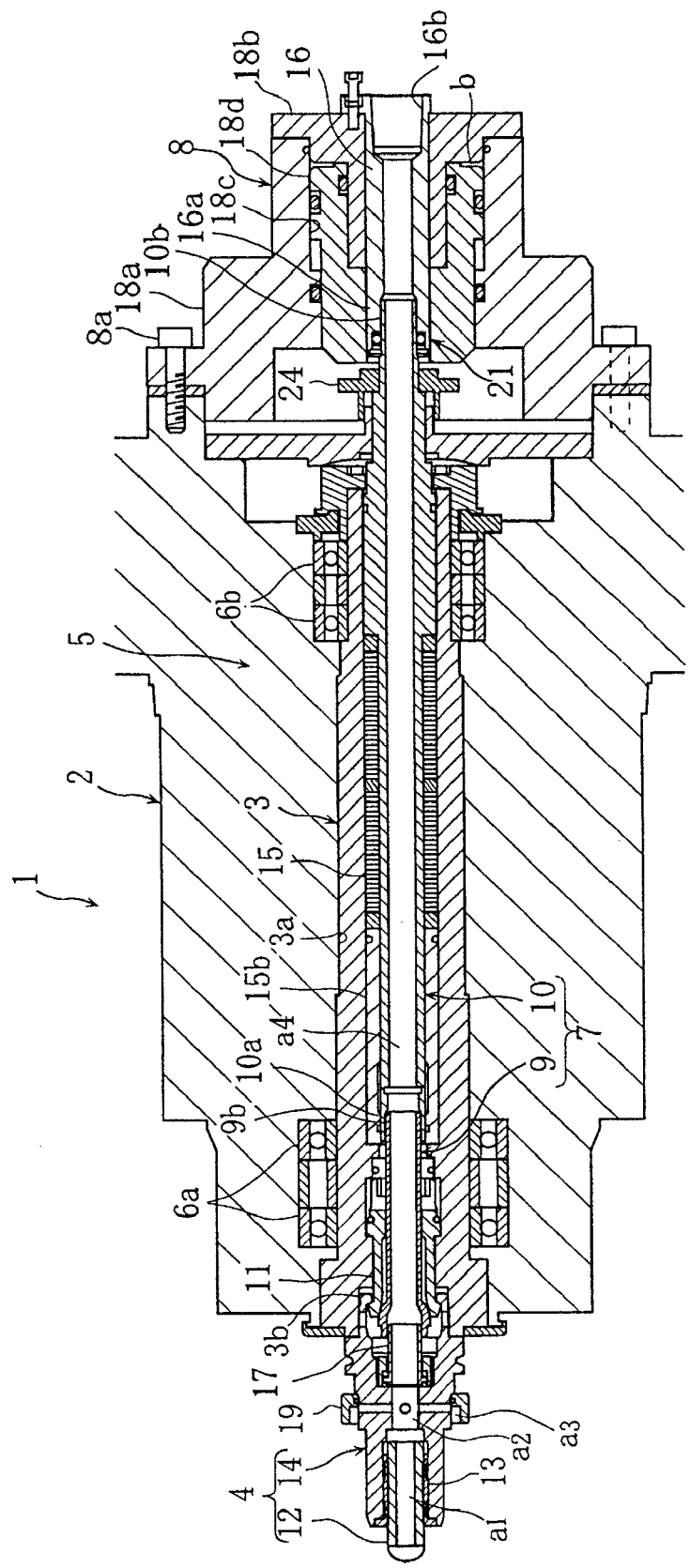
FIG. 1 is a side sectional view of a spindle device according to one embodiment of the present invention.
Figure 2:
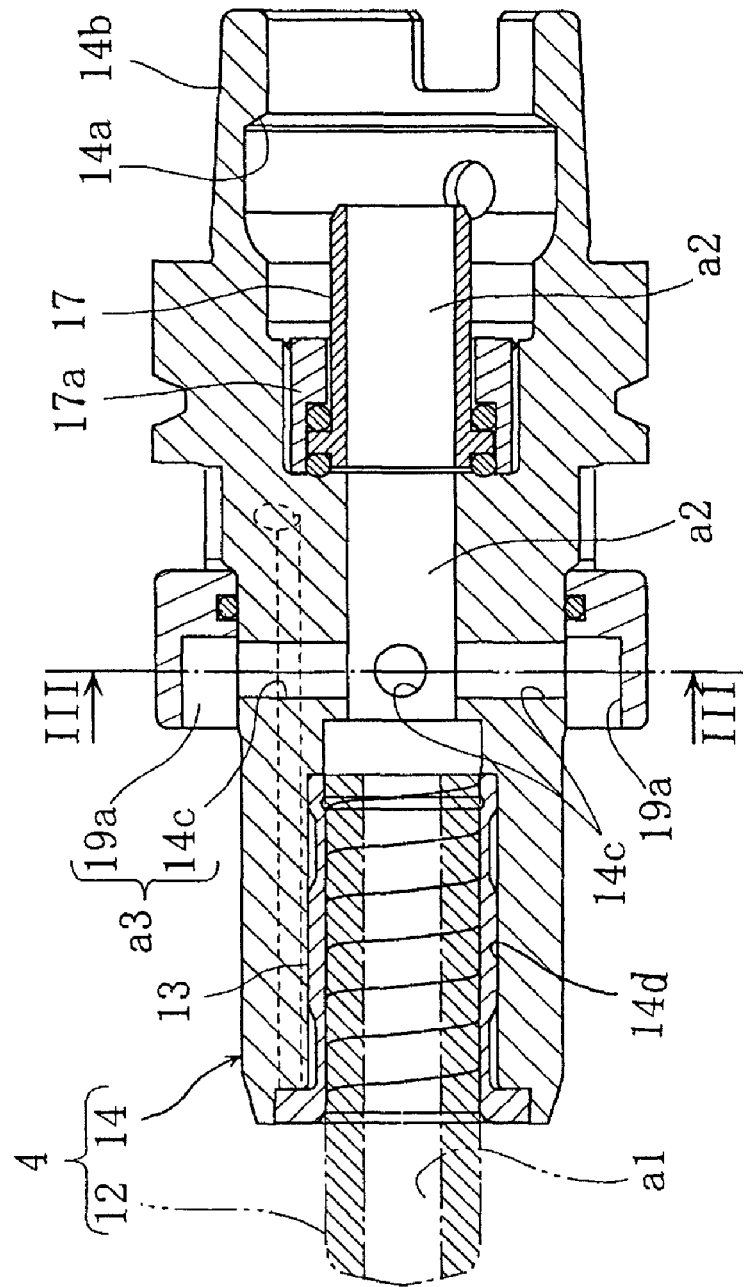
FIG. 2 is a side sectional view of a tool holder of the spindle device.
Figure 3:
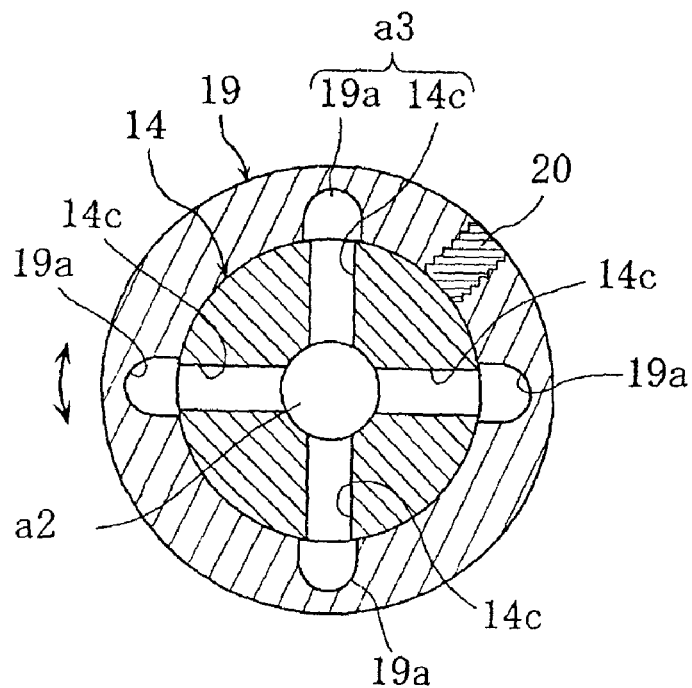
FIG. 3 is a side sectional view of the tool holder (sectional view taken along III-III line in FIG. 2)
Figure 4:
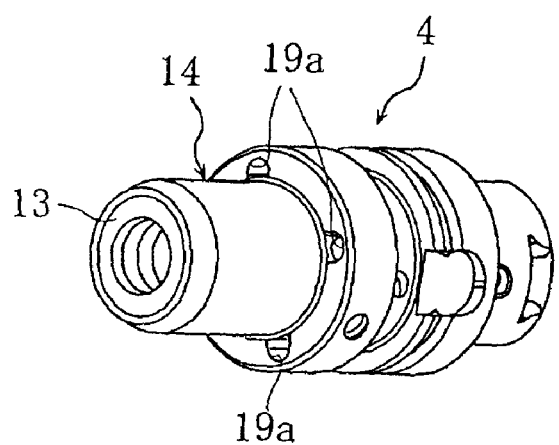
FIG. 4 is a perspective view of the tool holder.
Figure 5:
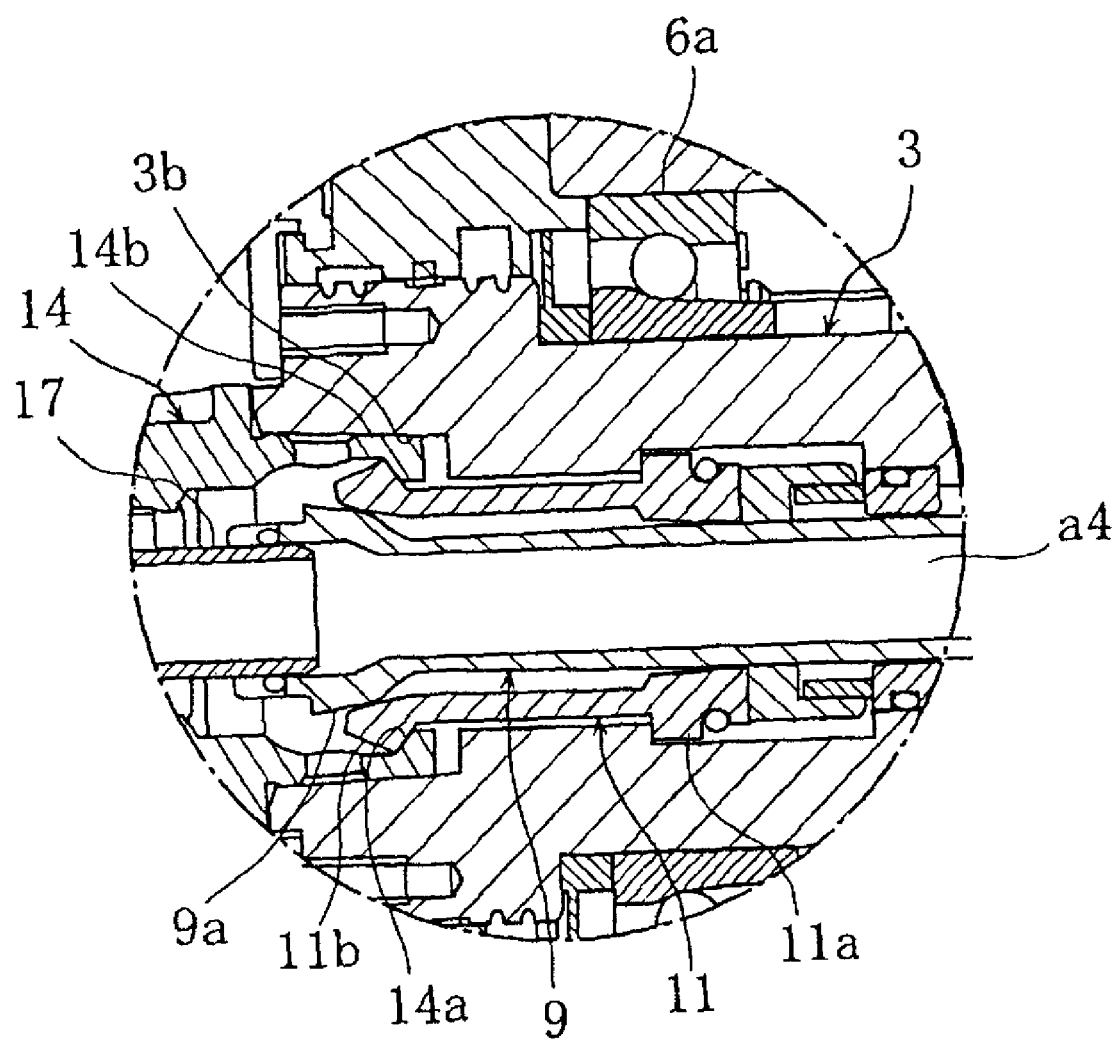
FIG. 5 is a side sectional view of a clamped portion of the tool holder of the spindle device.
Figure 6:
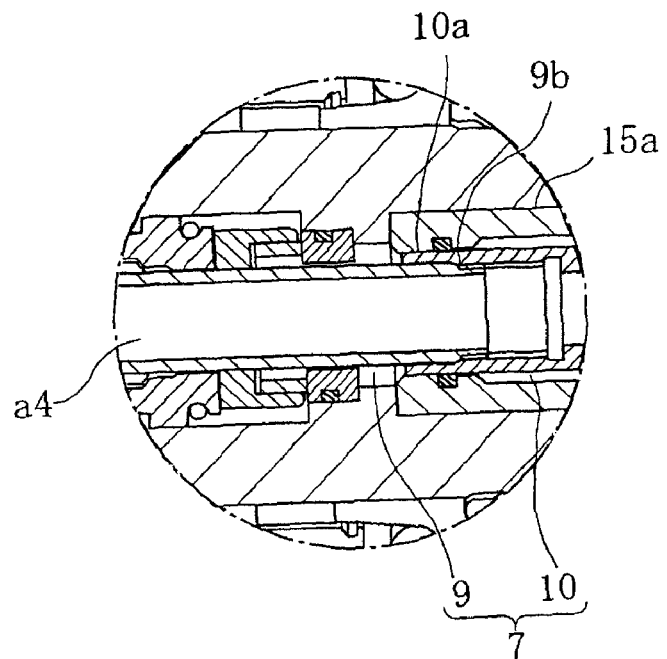
FIG. 6 is a side sectional view of a front connection portion of a draw bar of the spindle device.
Figure 7:
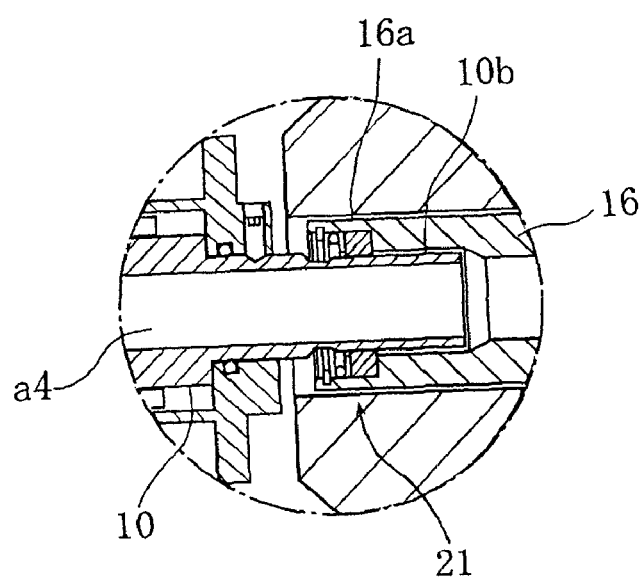
FIG. 7 is a side sectional view of a rear connection portion of the draw bar of the spindle device.
Figure 8:
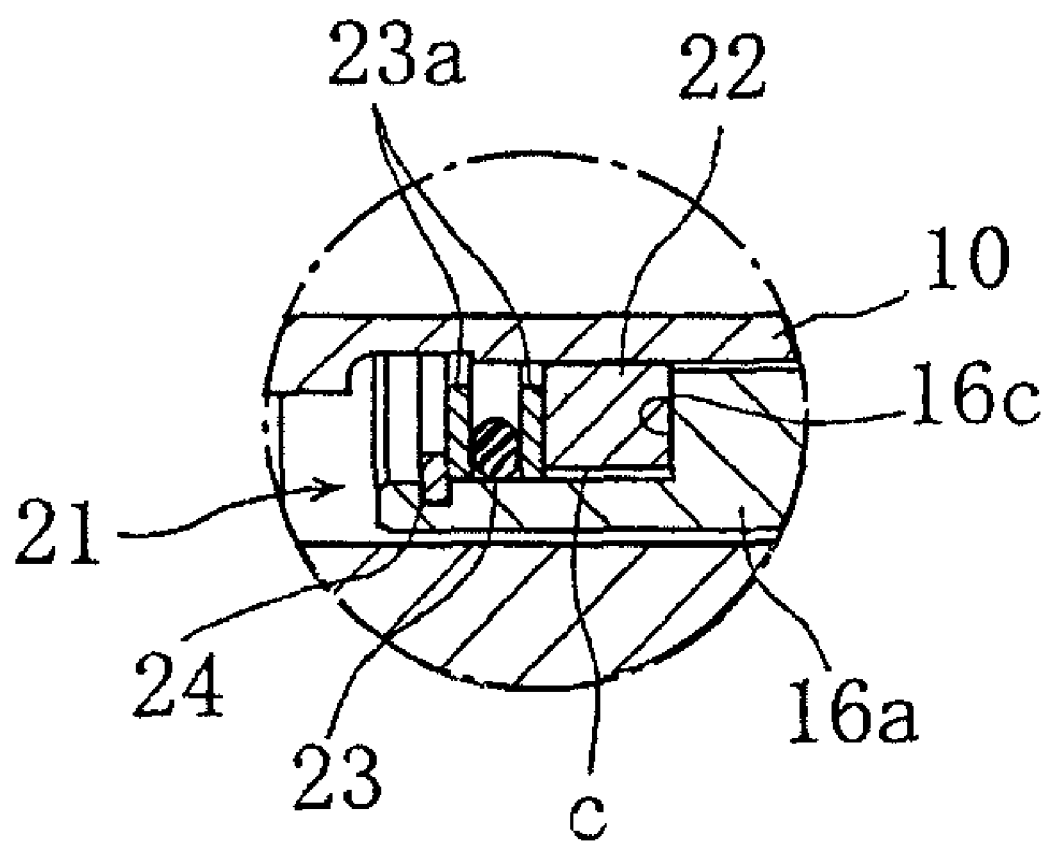
FIG. 8 is a side sectional view of a seal mechanism portion of the rear connection portion of the draw bar.

Hereinafter, an embodiment of the present invention will be described based on the accompanying drawings. FIG. 1 to FIG. 8 are views to explain a spindle device of a machine tool according to one embodiment of the present invention.

In the drawings, 1 denotes a spindle device included in a machine tool such as a vertical or horizontal machining center. The spindle device 1 has: a spindle head 2 supported by a column; a spindle 3 rotatably supported by the spindle head 2; a tool holder 4 supported by a tip portion of the spindle 3; and a clamping mechanism 5 clamping/unclamping the tool holder 4 to/from the spindle 3.

The spindle 3 is a cylinder having a through hole 3a in an axial center. A front portion and a rear portion of the spindle 3 are rotatably supported by the spindle head 2 via a front bearing 6a and a rear bearing 6b respectively. Further, a tapered hole 3b is formed in a front end portion of the through hole 3a of the spindle 3, and the tool holder 4 is fixedly fitted in the tapered hole 3b. An electric motor rotary-driving the spindle 3 is disposed between the spindle 3 and the spindle head 2, though not shown.

The tool holder 4 has a cutting tool 12 and a holder main body 14 in whose mounting hole 14d the cutting tool 12 is attached via a collet 13. By using the collet 13 adapted to the diameter or the like of the cutting tool 12, it is possible to attach various kinds of cutting tools to the common holder main body.

The clamping mechanism 5 includes: a draw bar 7 inserted in the through hole 3a of the spindle 3 to clamp or unclamp the tool holder 4 to/from the tapered hole 3b; and a drive mechanism (cylinder mechanism) 8 moving the draw bar 7 in an unclamping direction.

The draw bar 7 has: a cylindrical engagement drive part 9; and a cylindrical draw bar main body 10 detachably connected to the engagement drive part 9. A rear end 9b of the engagement drive part 9 is inserted into a front end 10a of the draw bar main body 10 to be screwed to an inner surface of the front end 10a. The engagement drive part 9 is inserted into a plurality of engaging claws 11 disposed near the tapered hole 3b so that the engaging claws 11 are engaged with an engaging step 14a formed in a rear end portion of the holder main body 14.

Each of the engaging claws 11 has, at its front end, a claw part 11b which is openable in a diameter direction with respect to a base end 11a of the engaging claw 11. A cam 9a is formed in a front end of the engagement drive part 9. The cam 9a, which is slidably in contact with inner surfaces of the claw parts 11b, brings the claw parts 11b into engagement with the engaging step 14a when it is at a backward position (right position in FIG. 1), and releases the engagement when it is at a forward position (left position in FIG. 1).

A large number of coned disc springs 15 are interposed between the draw bar main body 10 and the through hole 3a of the spindle 3. 15a denotes collar members restricting an axial position of the coned disc springs 15. The coned disc springs 15 bias the draw bar 7 in a clamping direction (right direction in FIG. 1). When the engagement drive part 9 is moved in the clamping direction by the biasing force, the cam 9a causes the claw parts 11b to open and as a result, the claw parts 11b are engaged with the engaging step 14a, so that a tapered part 14b of the holder main body 14 is firmly fitted in the tapered hole 3b.

The drive mechanism 8 is structured such that a piston 18d is inserted in a cylinder hole 18c formed by a casing 18a, which is clamped and fixed to a rear end portion of the spindle head 2 by bolts 8a, and a cover member 18b. When an oil pressure is supplied to an oil chamber b, the piston 18d moves leftward in FIG. 1 to move the draw bar 7 in the unclamping direction (left direction in FIG. 1) via a pressure plate 24 against the biasing force of the coned disc springs 15, thereby releasing the engagement of the tapered part 14b of the holder main body 14 and the tapered hole 3b.

Further, a coupling pipe 17 is coaxially inserted in the cam 9a of the engagement drive part 9, and the coupling pipe 17 is fixed in the holder main body 14 by a nut member 17a.

Further, a rear end 10b of the draw bar main body 10 is inserted in a front end 16a of an inner pipe 16 of the drive mechanism 8. The inner pipe 16 is inserted in the cover member 18b and also fixed to the cover member 18b.

Between the inner pipe 16 and the rear end 10b of the draw bar main body 10, a seal mechanism 21 is provided to prevent outside air from being sucked into the inner pipe 16. The seal mechanism 21 includes: a carbon seal ring 22 slidably in contact with an outer peripheral surface of the rear end 10b of the draw bar main body 10; a pressure ring 23 made of an elastic member and bringing the seal ring 22 into pressure contact with a step 16c of the inner pipe 16 via a spacer 23a; and a snap ring 24 restricting an axial position of the pressure ring 23.

An end surface of the seal ring 22 is in pressure contact with the step 16c owing to the elastic force of the elastic member and an inner peripheral surface thereof is slidably in contact with the outer peripheral surface of the draw bar main body 10, thereby preventing the entrance of outside air. A clearance c is provided between an outer peripheral surface of the seal ring 22 and an inner peripheral surface of the inner pipe 16. This prevents the seal ring 22 from being damaged when it vibrates between the draw bar main body 10 and the inner pipe 16.

In axial core portions of the coupling pipe 17, the draw bar 7, and the inner pipe 16, a fourth suction hole a4 is formed to penetrate therethrough in the axial direction. As for the fourth suction hole a4, the diameters of its portion in the coupling pipe 17, its portion in the engagement drive part 9, its portion in the draw bar main body 10, and its portion in the inner pipe 16 are set substantially equal. Further, a suction device, though not shown, is coupled to a rear end 16b of the inner pipe 16. Note that, though it is described in the present invention that a draw bar-side suction hole, which refers to the suction hole formed in the draw bar 7, communicates with the holder-side suction hole, a case where the suction hole of the draw bar 7 communicates with the holder-side suction hole via the coupling pipe 17 as in this embodiment is also included in the present invention.

In an axial core of the cutting tool 12 of the tool holder 4, a first suction hole a1 is formed to penetrate through the cutting tool 12 in the axial direction. Further, in the holder main body 14, a second suction hole (holder-side suction hole) a2 is formed so as to communicate with the first suction hole a1 and so as to penetrate through the holder main body 14 in the axial direction. Further, a third suction hole a3 is formed in the holder main body 14 so as to communicate with the second suction hole a2. The third suction hole a3 is formed to be capable of sucking air other than suction air coming from the first suction hole a1 of the cutting tool 12, thereby increasing the velocity in the second suction hole a2. A substantial passage area of the third suction hole a3 is adjustable.

The third suction hole a3 is structured as follows. A ring member 19 in an annular shape is attached to the outer periphery of the holder main body 14 at a portion corresponding to the second suction hole a2, that is, at a portion between the cutting tool 12 and the coupling pipe 17 so as to be rotatable and so as to be fixable at a desired angle position by a setscrew 20. In an inner surface of the ring member 19, suction parts 19a in a groove shape whose axial fronts are open are formed at 90-degree intervals. Further, in the holder main body 14, communication parts 14c are formed via which the suction parts 19a and the second suction hole a2 are communicatable with each other. The suction parts 19a and the communication parts 14c form the third suction hole a3 which functions to suck the air other than the suction air coming from the first suction hole a1 into the second suction hole a2 and thereby increases the velocity in the second suction hole a2. Further, adjusting the angle position of the ring member 19 makes it possible to adjust a communication area between the suction parts 19a and the communication parts 14c, that is, the substantial passage area of the third suction hole a3.

As described above, in this embodiment, the first suction hole a1 is formed in the cutting tool 12, the second and third suction holes a2 and a3 are formed in the holder main body 14, and the fourth suction hole a4 is formed in the draw bar 7 and the inner pipe 16, and the suction device is coupled to the inner pipe 16. Consequently, it is possible to realize the suction of cutting chips in dust form with a simple structure.

Further, the third suction hole a3 in addition to the second suction hole a2 is formed in the holder main body 14, and therefore, even when the passage area of the first suction hole a1 cannot be made large enough because the diameter of the cutting tool is small, the air other than the suction air coming from the first suction hole a1 can be sucked through the third suction hole a3. This can increase the velocity in the second suction hole a2, and as a result, it is possible to prevent cutting chips from depositing in the tool holder and the draw bar.

Further, the third suction hole a3 has the suction parts 19a of the ring member 19 rotatably attached to the holder main body 14 and the communication parts 14c via which the suction parts 19a and the second suction hole a2 are communicatable with each other. Therefore, by adjusting the angle position of the ring member 19, it is possible to adjust the substantial passage area of the third suction hole a3 according to the diameter of the cutting tool and a generation amount of cutting chips. This can prevent the internal deposition of the cutting chips.

Furthermore, in this embodiment, the rear end 9b of the engagement drive part 9 forming the front portion of the draw bar 7 is inserted into the front end 10a of the draw bar main body 10 forming the rear portion of the draw bar 7 to be screwed to the inner surface of the front end 10a, so that the both are attachable/detachable to/from each other. Therefore, it is possible to ensure a sufficiently large diameter of the first suction hole a1 without increasing the inside diameter of the spindle, especially of its portion corresponding to the engagement drive part 9. From this point of view as well, it is possible to enhance suction efficiency of cutting chips.

Incidentally, a structure in which the rear end 9b of the engagement drive part 9 is put over and screwed to the front end 10 of the draw bar main body 10 results in an increase in diameter of the rear end of the engagement drive part even if the diameter of the fourth suction hole a4 is the same, and as a result, due to the structure in which the engaging claws 11 are disposed on an outer side of the engagement drive part 9, this structure results in an increase in the diameter of the through hole of the spindle, and thus an increase in the outside diameter of the spindle.

Further, since the seal mechanism 21 is provided between the inner pipe 16 and the rear end 10b of the draw bar main body 10, it is possible to prevent outside air from being sucked into the inner pipe 16, which can enhance efficiency in collecting cutting chips.

Further, in the seal mechanism 21, the pressure ring 23 made of the elastic member is provided to bring the seal ring 22, which is slidably in contact with the outer peripheral surface of the rear end 10b of the draw bar main body 10, into pressure contact with the step 16c of the inner pipe 16. This makes it possible to constantly bring the end surface of the seal ring 22 into pressure contact with the step 16c owing to the elastic force of the elastic member while bringing the seal ring 22 into slidable contact with the outer peripheral surface of the draw bar main body 10, which makes it possible to more surely prevent the entrance of outside air. Further, the clearance c is provided between the outer peripheral surface of the seal ring 22 and the inner peripheral surface of the inner pipe 16, which can prevent the seal ring 22 from being damaged when it vibrates between the draw bar main body 10 and the inner pipe 16.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A spindle device of a machine tool comprising:
   a spindle head;
   a spindle which is rotatably supported by said spindle head and to which a tool holder is attachable; and
   a clamping mechanism clamping and unclamping the tool holder to and from said spindle, wherein:
   said clamping mechanism includes: a draw bar having a longitudinal axis and bringing an engaging claw into engagement with the tool holder or releasing the engagement; and a drive mechanism moving said draw bar in an unclamping direction;
   said draw bar has a draw bar-side suction hole penetrating through said draw bar in an axial direction and communicating with a holder-side suction hole formed in the tool holder;
   said draw bar includes: an engagement drive part moving the engaging claw to an engagement position with the tool holder; and a draw bar main body connected to the engagement drive part;
   the engagement drive part is inserted in the draw bar main body and detachably connected to an inner surface of the draw bar main body;
   and said drive mechanism has an inner pipe into which a rear end of said draw bar main body is inserted, and
   the spindle device further comprising a seal mechanism which is provided between said inner pipe and said draw bar main body and which has a seal member fixed to said inner pipe and slidably in contact with an outer peripheral surface of said draw bar main body.

2. The spindle device of the machine tool according to claim 1, wherein
the detachable connection of the engagement drive part to the draw bar main body is achieved in that the engagement drive part is inserted to be screwed to the inner surface of the draw bar main body.

3. A spindle device of a machine tool comprising:

a spindle head;

a spindle which is rotatably supported by said spindle head and to which a tool holder is attachable;

a clamping mechanism clamping and unclamping the tool holder to and from said spindle, wherein:

said clamping mechanism includes: a draw bar having a longitudinal axis and bringing an engaging claw into engagement with the tool holder or releasing the engagement; and a drive mechanism moving said draw bar in an unclamping direction;

said draw bar has a draw bar-side suction hole penetrating through said draw bar in an axial direction and communicating with a holder-side suction hole formed in the tool holder; and said drive mechanism has an inner pipe into which a rear end of said draw bar is inserted, and the spindle device further comprising a seal mechanism which is provided between said inner pipe and said draw bar and which has a seal member fixed to said inner pipe and slidably in contact with an outer peripheral surface of said draw bar.

4. The spindle device of the machine tool according to claim 3, wherein
said seal mechanism includes an elastic member biasing the seal member in a direction towards the inner pipe so as to bring the seal member into pressure contact with a step of said inner pipe.

* * * * *